(12) United States Patent
Adams et al.

(10) Patent No.: US 8,245,046 B2
(45) Date of Patent: *Aug. 14, 2012

(54) INTERCONNECT DEVICE TO ENABLE COMPLIANCE WITH RIGHTS MANAGEMENT RESTRICTIONS

(75) Inventors: Cheryl Adams, Cary, NC (US); Gregory Morgan Evans, Raleigh, NC (US); Thomas A. Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,577

(22) Filed: Feb. 17, 2011

(65) Prior Publication Data

US 2011/0145935 A1 Jun. 16, 2011

Related U.S. Application Data

(63) Continuation of application No. 11/764,460, filed on Jun. 18, 2007, now Pat. No. 7,895,442.

(51) Int. Cl.
*H04L 29/06* (2006.01)
*H04L 9/32* (2006.01)
*G06F 21/00* (2006.01)

(52) U.S. Cl. ........... 713/176; 713/169; 705/57; 382/100

(58) Field of Classification Search ........................ None
See application file for complete search history.

(56) References Cited

U.S. PATENT DOCUMENTS

| | | |
|---|---|---|
| 5,613,004 A | 3/1997 | Cooperman et al. |
| 5,687,236 A | 11/1997 | Moskowitz et al. |
| 6,141,753 A | 10/2000 | Zhao et al. |
| 6,389,541 B1 | 5/2002 | Patterson |
| 6,735,699 B1 | 5/2004 | Sasaki et al. |
| 6,751,670 B1 | 6/2004 | Patterson |

(Continued)

FOREIGN PATENT DOCUMENTS

GB 2306869 A 11/1995

(Continued)

OTHER PUBLICATIONS

Koch, E., et al., "Towards Robust and Hidden Image Copyright Labeling," Proceedings of 1995 IEEE Workshop on Nonlinear Signal and Image Processing, Jun. 20-22, 1995, 4 pages.

(Continued)

*Primary Examiner* — Shin-Hon Chen
(74) *Attorney, Agent, or Firm* — Withrow & Terranova, PLLC

(57) ABSTRACT

To help ensure that only authorized media content that is associated with rights management (RM) restrictions is delivered from a compliant RM interface of a source device to a non-compliant RM interface of a destination device, an interconnect device provides a compliant RM interface to connect to the source device and monitors media content received from the source device to detect an embedded digital watermark. The interconnect device takes the necessary steps to determine if the watermark is authentic and control delivery of the media content to the destination device accordingly. The interconnect device may go back to the source device or to a remote service to authenticate the watermark. If the watermark is authentic, the media content is passed by the interconnect device to the non-compliant interface of the destination device outside of normal RM restrictions. Otherwise, the delivery of the media content is restricted by the interconnect device.

5 Claims, 14 Drawing Sheets

U.S. PATENT DOCUMENTS

| | | | |
|---|---|---|---|
| 6,804,779 B1 | 10/2004 | Carroni et al. | |
| 6,980,204 B1 | 12/2005 | Hawkins et al. | |
| 6,987,985 B2 | 1/2006 | Purkayastha et al. | |
| 7,003,131 B2 | 2/2006 | Watson et al. | |
| 7,016,668 B2 | 3/2006 | Vaidyanathan et al. | |
| 7,036,024 B2 | 4/2006 | Watson | |
| 7,065,607 B2 | 6/2006 | England et al. | |
| 7,069,580 B1 | 6/2006 | Deitz et al. | |
| 7,242,766 B1 | 7/2007 | Lyle | |
| 7,369,677 B2 | 5/2008 | Petrovic et al. | |
| 7,415,617 B2 | 8/2008 | Ginter et al. | |
| 7,562,397 B1 | 7/2009 | Mithal et al. | |
| 2001/0051996 A1 | 12/2001 | Cooper et al. | |
| 2002/0010759 A1 | 1/2002 | Hitson et al. | |
| 2002/0049580 A1 | 4/2002 | Kutaragi et al. | |
| 2002/0054578 A1 | 5/2002 | Zhang et al. | |
| 2002/0061029 A1 | 5/2002 | Dillon | |
| 2002/0104003 A1 | 8/2002 | Iwamura | |
| 2002/0104099 A1 | 8/2002 | Novak | |
| 2002/0122141 A1 | 9/2002 | Lee | |
| 2002/0129367 A1 | 9/2002 | Devara | |
| 2002/0141578 A1 | 10/2002 | Ripley et al. | |
| 2002/0144267 A1 | 10/2002 | Gutta et al. | |
| 2002/0156842 A1 | 10/2002 | Signes et al. | |
| 2002/0168082 A1 | 11/2002 | Razdan | |
| 2003/0009769 A1 | 1/2003 | Hensgen et al. | |
| 2003/0050055 A1 | 3/2003 | Ting et al. | |
| 2003/0081580 A1 | 5/2003 | Vaidyanathan et al. | |
| 2003/0084294 A1* | 5/2003 | Aoshima et al. | 713/169 |
| 2003/0093665 A1 | 5/2003 | Cooper et al. | |
| 2003/0161268 A1 | 8/2003 | Larsson et al. | |
| 2003/0191850 A1 | 10/2003 | Thornton | |
| 2004/0008864 A1 | 1/2004 | Watson et al. | |
| 2004/0010692 A1 | 1/2004 | Watson | |
| 2004/0010694 A1 | 1/2004 | Collens et al. | |
| 2004/0030798 A1 | 2/2004 | Andersson et al. | |
| 2004/0042421 A1 | 3/2004 | Mahany | |
| 2004/0070593 A1 | 4/2004 | Neely et al. | |
| 2004/0073916 A1* | 4/2004 | Petrovic et al. | 725/18 |
| 2004/0083487 A1 | 4/2004 | Collens et al. | |
| 2004/0086122 A1 | 5/2004 | Watson | |
| 2004/0088557 A1 | 5/2004 | Malcolm et al. | |
| 2004/0117824 A1 | 6/2004 | Karaoguz et al. | |
| 2004/0139047 A1 | 7/2004 | Rechsteiner et al. | |
| 2004/0156528 A1 | 8/2004 | Joo et al. | |
| 2004/0187005 A1 | 9/2004 | Molaro | |
| 2004/0248615 A1 | 12/2004 | Purkayastha et al. | |
| 2004/0263941 A1 | 12/2004 | Chen et al. | |
| 2004/0264372 A1 | 12/2004 | Huang | |
| 2005/0008017 A1 | 1/2005 | Datta et al. | |
| 2005/0034001 A1 | 2/2005 | Pontarelli | |
| 2005/0050103 A1 | 3/2005 | Kesteloot et al. | |
| 2005/0081042 A1 | 4/2005 | Venkatesan et al. | |
| 2005/0086069 A1 | 4/2005 | Watson et al. | |
| 2005/0097331 A1 | 5/2005 | Majidimehr et al. | |
| 2005/0108769 A1 | 5/2005 | Arnold et al. | |
| 2005/0120127 A1 | 6/2005 | Bradley et al. | |
| 2005/0123135 A1 | 6/2005 | Hunt et al. | |
| 2005/0125405 A1 | 6/2005 | Watson et al. | |
| 2005/0144468 A1 | 6/2005 | Northcutt et al. | |
| 2005/0182876 A1 | 8/2005 | Kim et al. | |
| 2005/0182989 A1 | 8/2005 | Zarnke et al. | |
| 2005/0183120 A1 | 8/2005 | Jain et al. | |
| 2005/0192987 A1 | 9/2005 | Marsh | |
| 2005/0201726 A1 | 9/2005 | Malcolm et al. | |
| 2005/0216942 A1 | 9/2005 | Barton | |
| 2005/0220321 A1 | 10/2005 | Langelaar | |
| 2005/0239497 A1 | 10/2005 | Bahl et al. | |
| 2005/0251486 A1* | 11/2005 | Nair | 705/57 |
| 2005/0286438 A1 | 12/2005 | Rajkotia | |
| 2006/0010274 A1 | 1/2006 | Olson | |
| 2006/0015735 A1 | 1/2006 | Kudo et al. | |
| 2006/0048185 A1 | 3/2006 | Alterman | |
| 2006/0048186 A1 | 3/2006 | Alterman | |
| 2006/0050880 A1 | 3/2006 | Taylor et al. | |
| 2006/0053452 A1 | 3/2006 | Lee et al. | |
| 2006/0053472 A1 | 3/2006 | Goto et al. | |
| 2006/0056349 A1 | 3/2006 | Nakatugawa et al. | |
| 2006/0059560 A1 | 3/2006 | Montulli | |
| 2006/0072786 A1 | 4/2006 | Watson et al. | |
| 2006/0075243 A1 | 4/2006 | Lakamp et al. | |
| 2006/0085534 A1 | 4/2006 | Ralston et al. | |
| 2006/0085830 A1 | 4/2006 | Bruck et al. | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095792 A1 | 5/2006 | Hurtado et al. | |
| 2006/0123235 A1 | 6/2006 | Vanstone | |
| 2006/0126888 A1 | 6/2006 | Talstra et al. | |
| 2006/0127037 A1 | 6/2006 | Van Hoff et al. | |
| 2006/0133644 A1 | 6/2006 | Wells et al. | |
| 2006/0156003 A1 | 7/2006 | Zhang et al. | |
| 2006/0156416 A1 | 7/2006 | Huotari et al. | |
| 2006/0158968 A1 | 7/2006 | Vanman et al. | |
| 2006/0161776 A1 | 7/2006 | Van Der Veen et al. | |
| 2006/0173794 A1 | 8/2006 | Sellars et al. | |
| 2006/0174128 A1 | 8/2006 | Yuval | |
| 2006/0193492 A1* | 8/2006 | Kuzmich et al. | 382/100 |
| 2006/0200416 A1 | 9/2006 | White et al. | |
| 2006/0282676 A1* | 12/2006 | Serret-Avila et al. | 713/176 |
| 2007/0056046 A1 | 3/2007 | Claudatos et al. | |
| 2007/0100771 A1 | 5/2007 | Eckleder et al. | |
| 2007/0124474 A1 | 5/2007 | Margulis | |
| 2007/0130585 A1 | 6/2007 | Perret et al. | |
| 2007/0133673 A1 | 6/2007 | Imaizumi | |
| 2007/0269044 A1 | 11/2007 | Bruestle | |
| 2008/0005676 A1 | 1/2008 | Evans et al. | |
| 2008/0044087 A1 | 2/2008 | Levy et al. | |
| 2008/0148063 A1 | 6/2008 | Hanko et al. | |
| 2009/0037388 A1 | 2/2009 | Cooper et al. | |
| 2009/0287837 A1 | 11/2009 | Felsher | |
| 2009/0287940 A1 | 11/2009 | Carr | |

FOREIGN PATENT DOCUMENTS

| | | |
|---|---|---|
| WO | 2005045647 A2 | 5/2005 |
| WO | 2006046099 A2 | 5/2006 |

OTHER PUBLICATIONS

Setton, E., et al., "Cross-Layer Design of Ad Hoc Networks for Real-Time Video Streaming," IEEE Wireless Communications, Aug. 2005, vol. 12, Issue 4, pp. 59-65.

No Author, "Gefen HDMI CAT-5 Extreme User Manual", 2006, 16 pages.

No Author, "Global-Link Product Manual," Logical Solutions Inc., Jan. 2005, 68 pages.

No Author, "Introducting the World's First 'Legal' HDMI Distribution Amp with HDCP on Every Port!", PureLink Digital Extender, Dtrovision LLC, http://www.dtrovision.com, accessed Jul. 13, 2007.

No Author, "Global-Link: KVM over IP", http://www.thinklogical.com/products/globalLink.php, accessed Jul. 13, 2007.

Dittman, J., et al., "Robust MPEG Video Watermarking Technologies," Proceedings of the Sixth ACM international Conference on Multimedia, 1998, http://www.ipsi.fraunhofer.de/mobile/publications/fullpapers/ACM/acm_ab.doc, 10 pages.

Fridrich, J., "Applications of Data Hiding in Digital Images," Tutorial for the ISPACS '98 Conference in Melbourne, Australia, Nov. 4-6, 1998, 33 pages.

No Author, "Kaleidescape Home Page", Kaleidescape, Inc., http://www.kaleidescape.com, accessed Jul. 13, 2007.

No Author, "MediaMax Overview", http://www.axonix.com/mediamax/, accessed Jul. 13, 2007.

Judge, P., et al., "WHIM: Watermarking Multicast Video with a Hierarchy of Intermediaries," Computer Networks: The International Journal of Computer and Telecommunications Networking Archive, 2002, vol. 39, Issue 6, pp. 699-712.

No Author, "Xtendex Series ST-05DVI-150 150 Foot DVI Video Extender Installation and Operation Manual," Network Technologies Incorporated, revised Oct. 16, 2006.

Raisinghani, V., "ECLAIR: An Efficient Cross Layer Architecture for Wireless Protocol Stacks," 5th World Wireless Congress, San Francisco, CA, May 25-28, 2004.

Srivastava, V., et al., "Cross-Layer Design: A Survey and the Road Ahead," IEEE Communications Magazine, Dec. 2005, pp. 112-119.

No Author, "Double 108Mbps Wireless PC Card (WG511U), Netgear, Inc.," PC Connection, 2006, http://http://www.pcconnection.com/ProductDetail?sku=5373172&SourceID=k40132.

No Author, "The DVI 1000 HD (EXT-DVI-1000)," KVM Pro, accessed Nov. 1, 2006, http://www.kvmpro.com/gefen-kvm-extenders-dvi-the-dvi-1000-hd-p-213.html, 2 pages.

No Author, "The DVI CAT5 Extender (EXT-DVI-CAT5)," KVM Pro, accessed Nov. 1, 2006, http://www.kvmpro.com/gefen-kvm-extenders-dvi-the-dvi-cat5-extender-p-214.html, 3 pages.

No Author, "DVI Extender CAT5", Network Technologies, Inc., accessed Jul. 13, 2007, http://www.networktechinc.com/cat5-dvi.html, 2 pages.

Lyle, J., "HDCP: what it is and how to use it," EDN, Apr. 18, 2002, http://www.edn.com/article/ca209091.html? q=&q=HDCP, 6 pages.

No Author, "KVM Switch, Avocent KVM over IP", KVM Pro, accessed Nov. 1, 2006, http://www.kvmpro.com/dvi-extender-c-38.html, 4 pages.

No Author, "KVM over IP Extender—Logical Solutions," KVM Pro, accessed Nov. 1, 2006, http://www.kvmpro.com/thinklogical-kvm-extenders-dvi-global-link-p-202.html, 3 pages.

No Author, "Remote Access to USB Devices, USB on IP," Network Technologies, Inc., accessed Nov. 1, 2006, http://www.networktechinc.com/usb-ip-extender.html, 2 pages.

No Author, "VGA KVM USB Extender RJ45, DVI 1394 FireWire via Fiber," Network Technologies, Inc., accessed Nov. 1, 2006, http://www.networktechinc.com/extenders.html.

No Author, "HDTV Extender", Network Technologies Incorporated, http://www.nti1.com/hdtv-extend.html, 2005.

No Author, "PureLink Digital Extender User Manual," Dtrovision LLC, 2006, 6 pages.

No Author, "High-bandwidth Digital Content Protection System," Digital Content Production LLC, Revision 1.3, Dec. 21, 2006, 20 pages.

Non-Final Rejection mailed Jun. 14, 2010, for U.S. Appl. No. 11/764,460.

Notice of Allowance mailed Oct. 28, 2010, for U.S. Appl. No. 11/764,460.

Notice of Allowance mailed Dec. 21, 2010, for U.S. Appl. No. 11/764,460.

Notice of Allowance mailed Jan. 6, 2011, for U.S. Appl. No. 11/764,460.

* cited by examiner

INTERCONNECT DEVICE TO ENABLE COMPLIANCE WITH RIGHTS MANAGEMENT RESTRICTIONS

CROSS-REFERENCE TO RELATED APPLICATION

The present application is a continuation of U.S. patent application Ser. No. 11/764,460, filed on Jun. 18, 2007, the disclosure of which is hereby incorporated by reference in its entirety.

FIELD OF THE INVENTION

The present invention relates to delivering restricted media content, and in particular to providing an interconnect device that allows a source device to deliver media content to a destination device that does not have a compliant rights management interface, when the source device has a compliant rights management interface.

BACKGROUND OF THE INVENTION

Copyright owners are in a constant battle against piracy of their media content. In the current digital world, high quality copies of digital content can be readily made and distributed without permission of the copyright owners. With the increasing availability of high definition video content and no or low compression audio content, the need to prevent unauthorized copies of audio and video content is greater than ever. In response to these needs, various digital rights management (DRM) techniques have evolved. DRM is a broad term that is used for various techniques used by copyright owners and authorized publishers to control access and restrict use of media content on associated electronic devices.

High-Bandwidth Digital Content Protection (HDCP) is a form of DRM that was developed by Intel Corporation and is widely used to control the delivery of audio and video media content from one electronic device to another. For HDCP, a source device is able to prevent or at least restrict the playback quality of otherwise high definition media content to DVD (Digital Video Disk) quality, or standard definition, when a destination device does not have an HDCP compliant media interface. Two common HDCP compliant media interfaces include the HDCP compliant High Definition Multimedia Interface (HDMI) and the HDCP compliant Digital Video Interface (DVI). When the destination device does have an HDCP compliant media interface, the high definition media content is generally encrypted by the source device and delivered to the destination device in a secure fashion.

For HDCP, the media interfaces of the respective source and destination devices are able to communicate with each other and play pivotal roles to ensure that the media content is protected. The media interface of the source device will authenticate the media interface of the destination device, and the respective media interfaces will exchange any necessary encryption information to facilitate encryption of the media content by the media interface of the source device, and decryption of the encrypted media content by the media interface of the destination device. Notably, this functionality is generally provided in the hardware at the media interfaces and not in the higher level control systems of the respective electronic devices. Other DRM techniques, such as the Advanced Access Content System (AACS), operate in a similar fashion.

Unfortunately, many audio and video processing and interface cards, which often provide the actual media interfaces for various types of electronic devices such as personal computers, DVD players, set-top boxes, digital video recorders, audio processors and receivers, video processors, televisions, monitors, projectors, and the like, do not comply with HDCP or other DRM techniques. The manufacturers of these processing and interface cards often do not incorporate DRM techniques due to increased processing overhead, increased complexity, licensing costs, liability, and the like. Even though the control systems of the electronic devices in which the processing and interface cards are located generally have the processing capability to provide the functionality of compliant media interfaces, the use of non-HDCP compliant processing and interface cards results in non-HDCP compliant electronic devices. Further, legacy products may not have interfaces that are compliant with current DRM requirements. As such, users of non-compliant electronic devices are unable to enjoy the higher resolution audio and video that would otherwise be available to them, if the processing and interface cards were HDCP compliant.

Accordingly, there is a need for a technique to allow a source device that has a DRM compliant media interface to securely deliver media content to a destination device that does not have a DRM compliant media interface without compromising the integrity of the media content.

SUMMARY OF THE INVENTION

For the present invention, a watermarking process is employed as a supplement or alternative to a primary rights management (RM) technique for media content. In general, an interconnect device is used to connect a source device to a destination device, and allows the source device's compliant rights management (RM) interface to deliver media content that is associated with certain RM restrictions with little or no restriction to the destination device's non-compliant RM interface. Without the interconnect device, the media content could not be delivered at all or would be delivered with significant quality reductions or like restrictions to any non-compliant RM interface of any destination device. To help ensure that only authorized media content that is associated with RM restrictions is delivered to the non-compliant RM interface of the destination device, the interconnect device provides a compliant RM interface to connect to the source device, and monitors media content received from the source device to detect an embedded digital watermark. The interconnect device will take the necessary steps to determine if the watermark is authentic and control delivery of the media content to the destination device accordingly. The interconnect device may go back to the source device or a remote service to authenticate the watermark. If the watermark is authentic, the media content is passed by the interconnect device to the non-compliant interface of the destination device outside of the normal RM restrictions. Otherwise, delivery of the media content to the non-compliant interface is prevented or restricted in some manner by the interconnect device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a media environment according to one embodiment of the present invention.

DETAILED DESCRIPTION OF THE PREFERRED EMBODIMENTS

Figure 1:
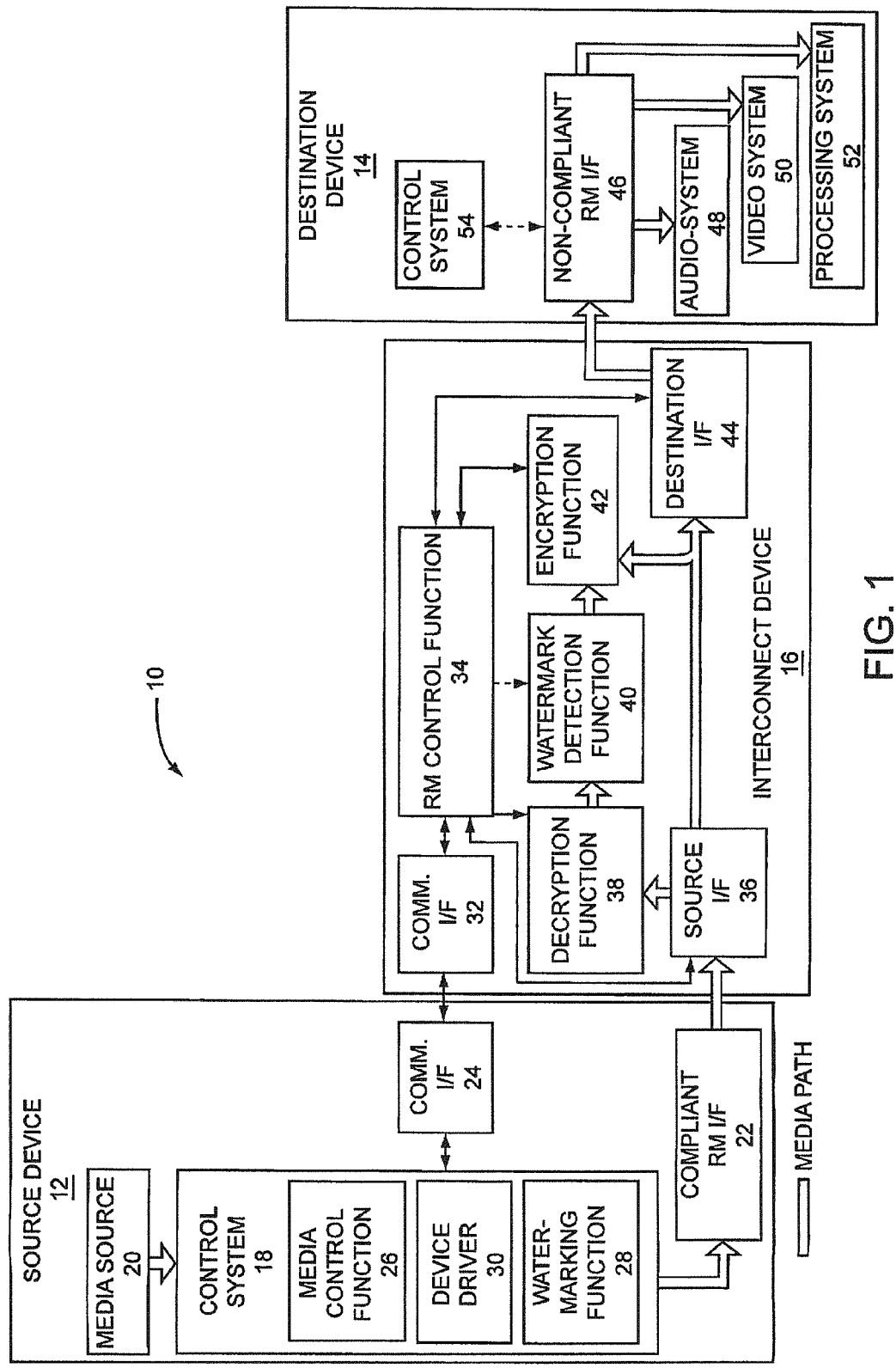
Figure 2A:
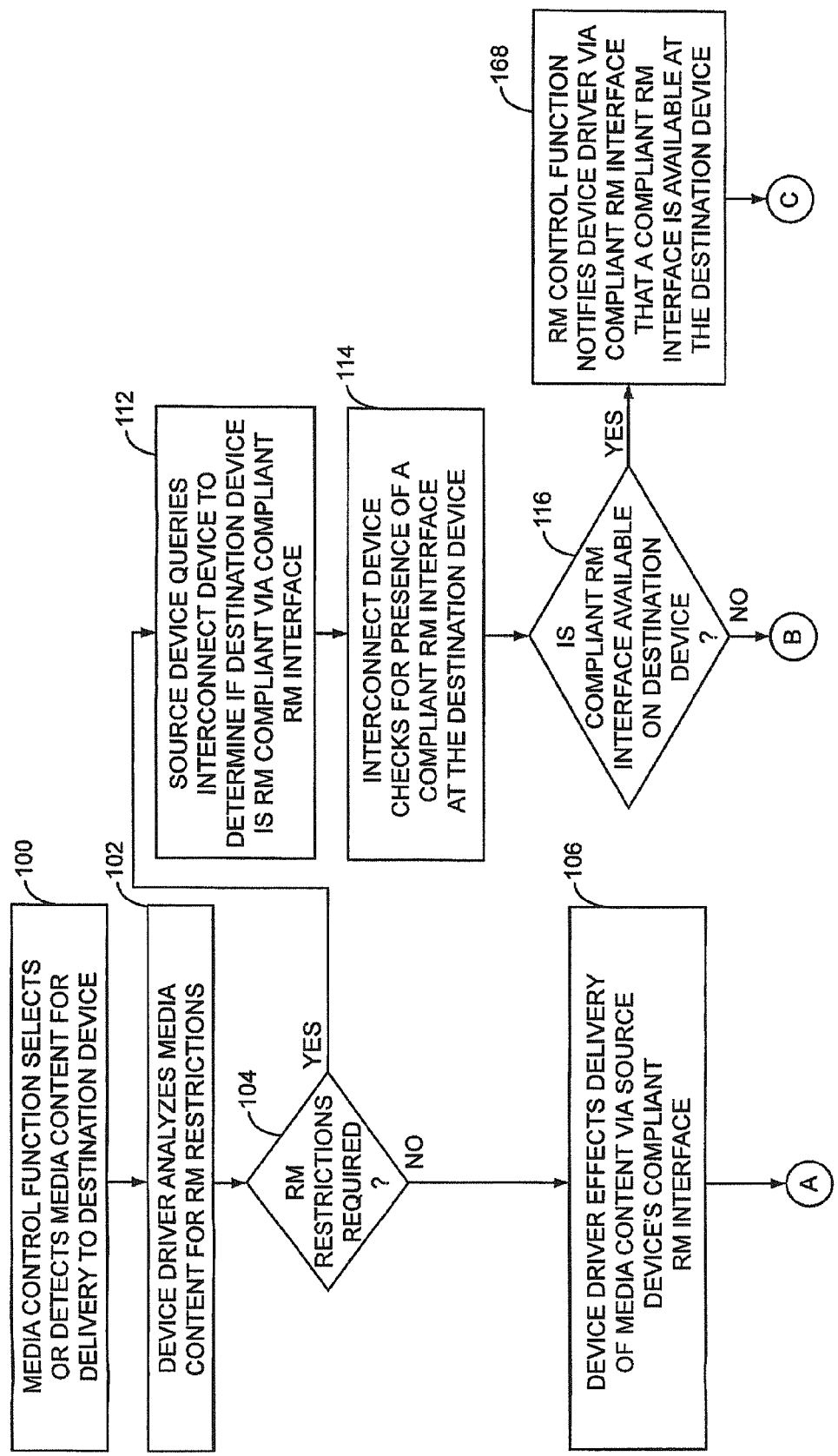
FIGS. 2A-2F are a flow diagram illustrating operation of one embodiment of the present invention.
Figure 2B:
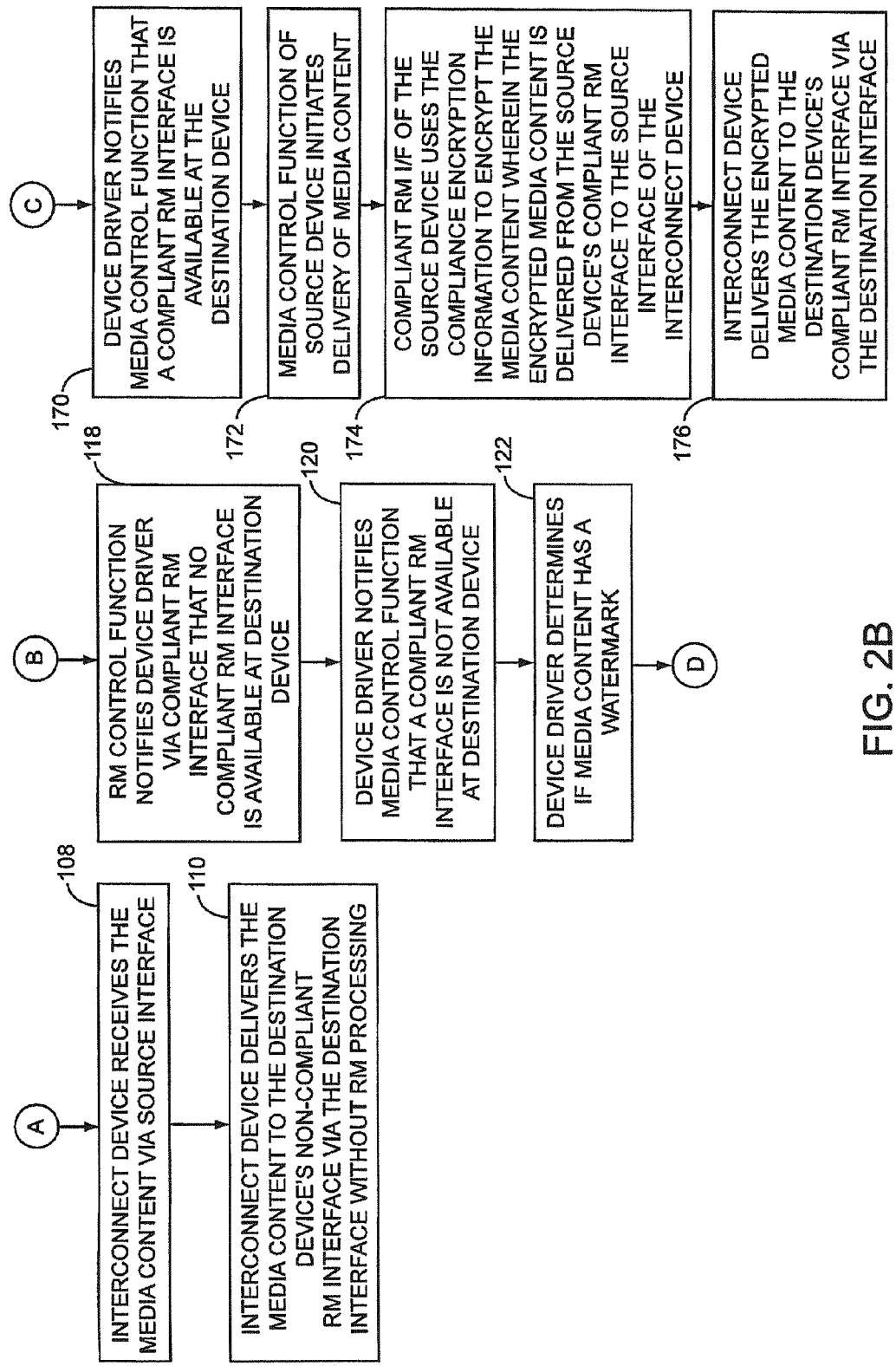
Figure 2C:
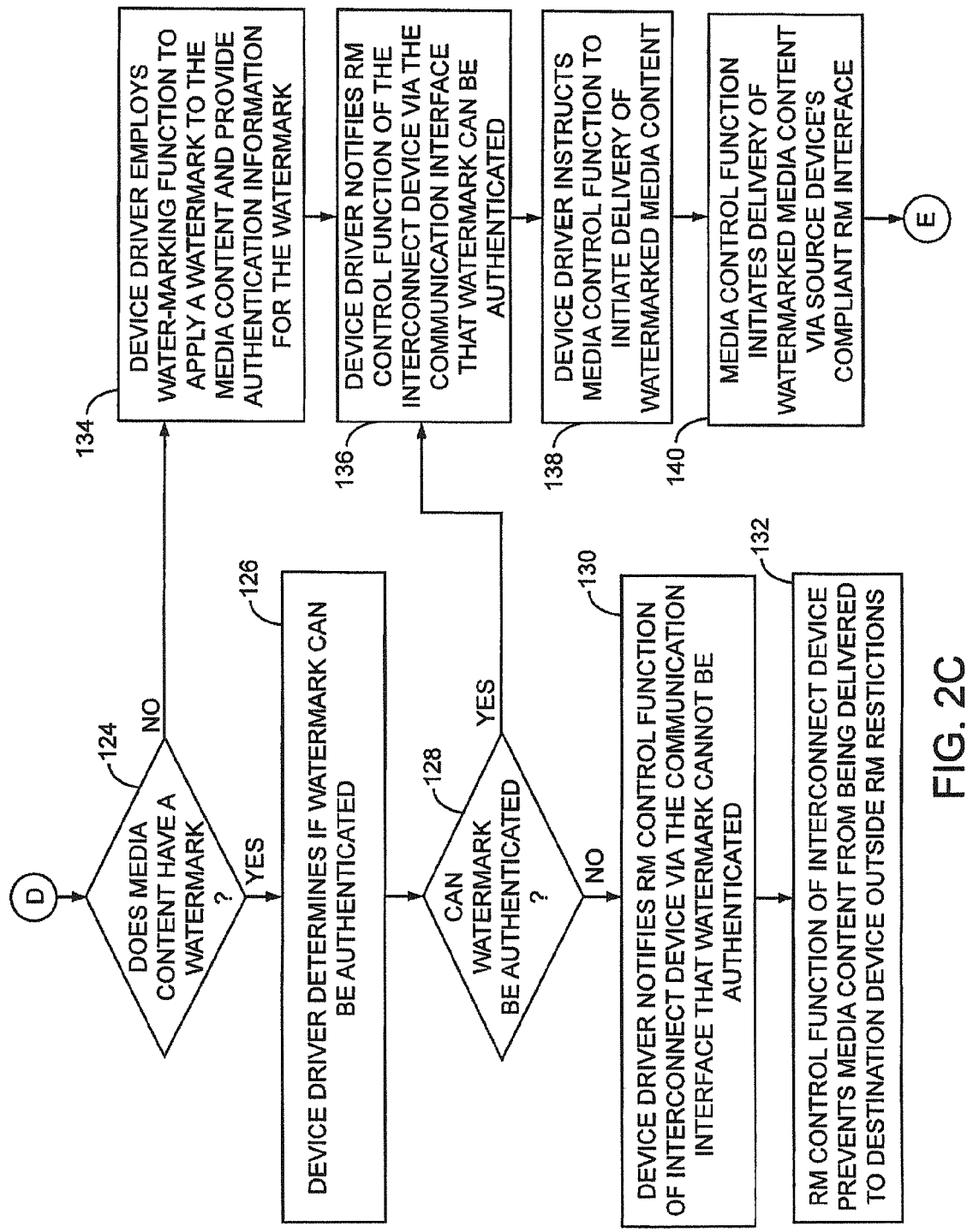
Figure 2D:
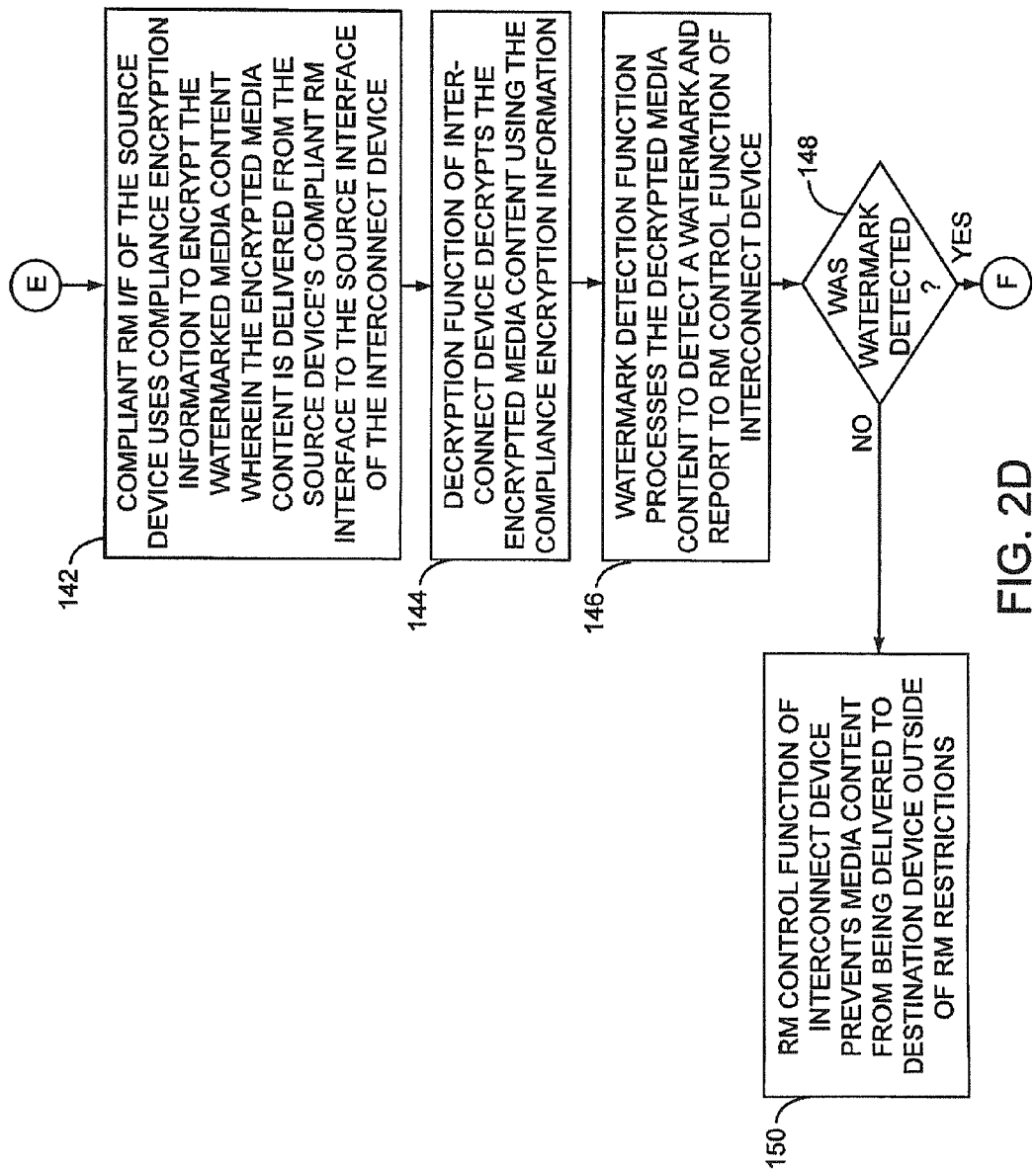
Figure 2E:
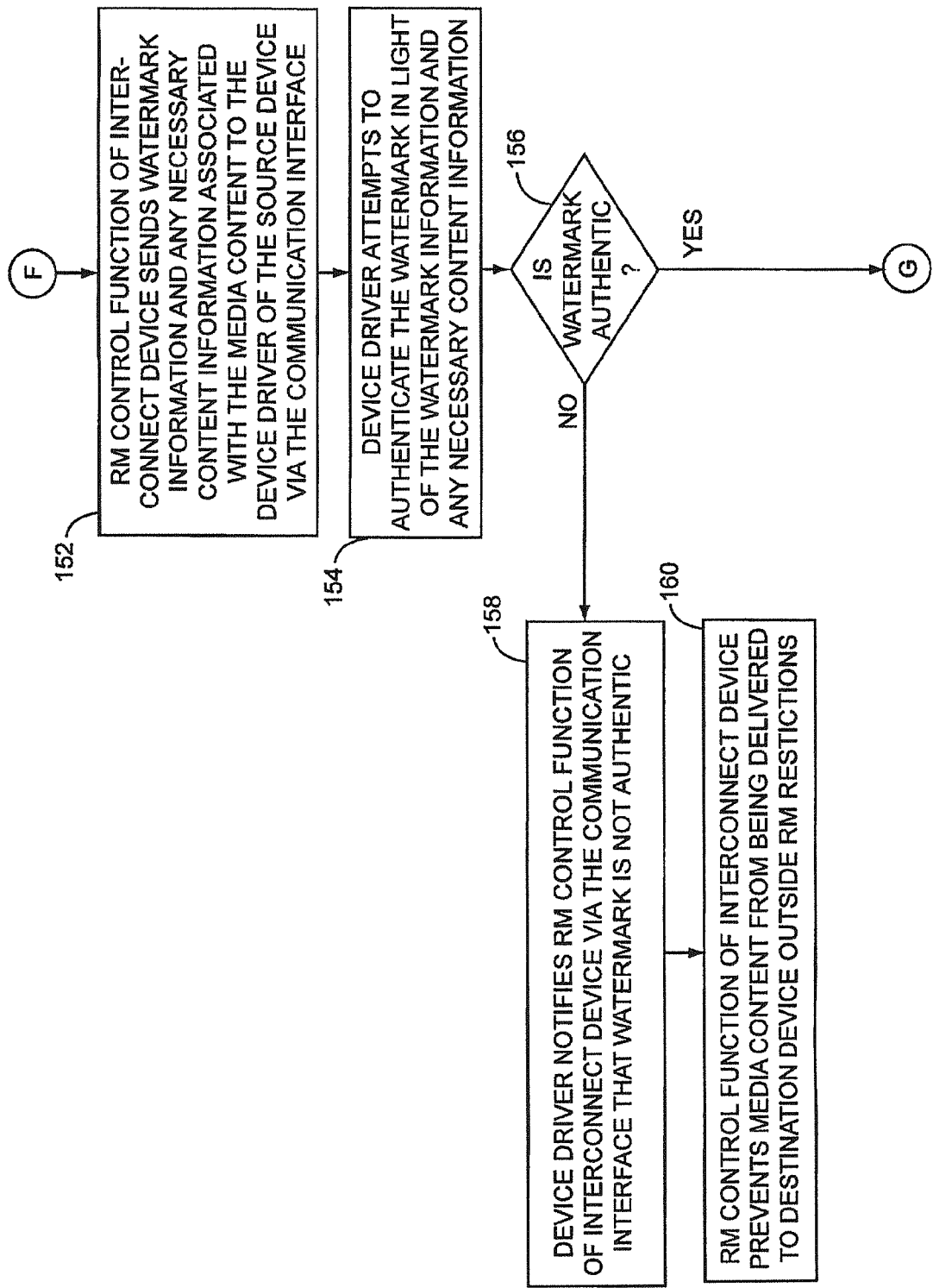
Figure 2F:
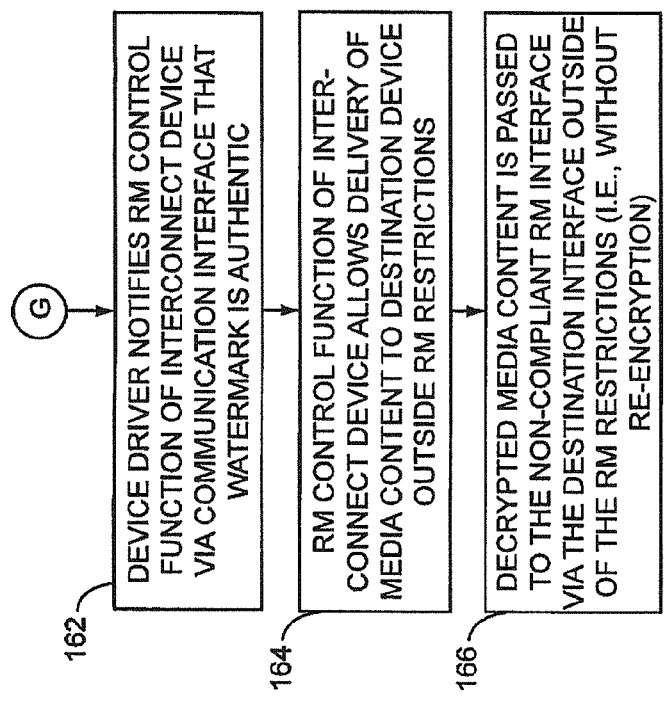

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Digital watermarking is an adaptation of traditional paper-based watermarking for digital media. In particular, digital watermarking is a process of embedding information into digital media content in a manner in which the information can be subsequently detected for use in a variety of applications. Embedding the watermark information for a watermark into media content actually modifies the data representing the media content. With image, audio, and video media content, such modifications are substantially imperceptible, and thus have little or no effect on the media content from a viewing or listening standpoint. Although applying a watermark has little impact on the quality of the media content, removing a watermark from the media content will degrade the media content.

Certain watermarking applications employ watermarks to prevent unauthorized copying or distribution of the media content. A digital watermark is generally used to identify the media content; a particular copy of the media content; an authorized owner, user, recipient, or distributor of the media content; or any combination thereof. Further, digital watermarks may be the same for all copies of certain content, or may be effectively unique to each copy of certain content to enable differentiation between copies of the same content.

A system that uses watermarks to prevent unauthorized copying or distribution of media content is generally able to process the media content and detect an embedded watermark. Detection of the embedded watermark results in identification of the embedded watermark information that was previously embedded in the media content when the watermark was originally applied. To authenticate a detected watermark, and thus the media content from which the watermark was extracted, the system may compare the watermark information with authentication information that is stored outside of the media content, or send the watermark information to another entity that has access to the authentication information and is able to compare the watermark information with the authentication information. Authentication of a given watermark may require comparing both the watermark information and content information with the authentication information. The content information may identify the media content itself or provide information related to the media content or a party associated therewith.

For the present invention, a watermarking process is employed as a supplement or alternative to a primary rights management (RM) technique for media content. In general, an interconnect device is used to connect a source device to a destination device, and allows the source device's compliant rights management (RM) interface to deliver media content that is associated with certain RM restrictions with little or no restriction to the destination device's non-compliant RM interface. Without the interconnect device, the media content could not be delivered at all or without significant quality or like restrictions to any non-compliant RM interface of any destination device. To help ensure that only authorized media content that is associated with RM restrictions is delivered to the non-compliant RM interface of the destination device, the interconnect device provides a compliant RM interface to connect to the source device, and monitors media content received from the source device to detect an embedded digital watermark. The interconnect device will take the necessary steps to determine if the watermark is authentic and control delivery of the media content to the destination device accordingly. The interconnect device may go back to the source device or a remote service to authenticate the watermark. If the watermark is authentic, the media content is passed by the interconnect device to the non-compliant interface of the destination device outside of the normal RM restrictions. Otherwise, the delivery of the media content to the non-compliant interface is prevented or restricted in some manner by the interconnect device.

Prior to delving into the operation details of the interconnect device, an overview of the interaction and basic architecture of a source device, interconnect device, and destination device are provided according to one embodiment of the present invention illustrated in FIG. 1. As illustrated, a source device 12 is coupled to a destination device 14 by an interconnect device 16. The source device 12 may take the form of a personal computer, DVD player, set-top box, digital video recorder, audio processor or receiver, video processor, or the like. The source device 12 has a control system 18 that is associated with a media source 20, a compliant RM interface (I/F) 22, and a communication interface 24. The media source 20 is the receiver or storage mechanism from which media content is obtained for delivery by the source device 12. The communication interface 24 is any type of communication interface, such as a personal area network (PAN) interface, local area network (LAN) interface, wireless LAN (WLAN) interface, or wide area network (WAN) interface. In general, the communication interface 24 is an alternate interface to the compliant RM interface 22, and is used to allow the source device 12 and the interconnect device 16 to communicate with each other to facilitate certain aspects of the present invention, which will be described below in further detail.

The compliant RM interface 22 is primarily a digital media interface from which media content is presented by the source device 12. The compliant RM interface 22 may be a digital visual interface (DVI), high-definition multimedia interface (HDMI), or the like. For the present invention, the compliant RM interface 22 is compliant with a desired rights management mechanism that is used to protect the media content as it is delivered from the source device 12 to the destination device 14. Normally, the compliant RM interface 22 would not allow certain media content to be delivered to a destination device that does not have a compliant RM interface, or would impose significant quality-related restrictions on any media content being delivered to a destination device that does not have a compliant RM interface due to the destination device's inability to comply with the rights management associated with the media content. The interconnect device 16 is able to cooperate with the source device 12 to allow the media content to be delivered from the source device 12 to the interconnect device 16 within RM restrictions, and then present the media content to the destination device 14 outside of the RM restrictions. As is described in detail further below, the present invention employs a watermark authentication scheme to ensure that only media content including an authentic watermark is delivered with little or no quality restrictions to the interconnect device 16.

In one embodiment, the control system 18 of the source device 12 will provide or be associated with a media control function 26, a watermarking function 28, and a device driver 30. In general, the media control function 26 operates to control delivery and playback of the media content provided by the media source 20. The watermarking function 28 is used to authenticate watermarks based on watermark information associated with the watermarks, and perhaps based on content information related to or identifying the media content. In certain embodiments, the watermarking function 28 may be configured to apply digital watermarks to the media content using appropriate watermark information.

Notably, the compliant RM interface 22 or associated function is employed to encrypt the media content in a secure fashion, such that the encrypted media content can be safely and securely delivered to the interconnect device 16. The device driver 30 is configured to communicate with the interconnect device 16 through the communication interface 24 to allow the source device 12 and the interconnect device 16 to cooperate with each other in a manner to facilitate coordinated control of media content delivery and authentication of watermarks that are recovered by interconnect device 16.

The interconnect device 16 will have a communication interface 32, which is coupled to the communication interface 24 of the source device 12. Through the communication interface 32, an RM control function 34 of the interconnect device 16 can effectively communicate with the device driver 30 of the source device 12. The RM control function 34 effectively coordinates operation of the interconnect device 16 with both the source device 12 and the destination device 14. In general, the RM control function 34 of the interconnect device 16 and the device driver 30 of the source device 12 may coordinate with one another to ensure that the media content having an authentic watermark can be delivered to the destination device 14 outside of the RM restrictions, yet in a secure fashion.

When the media control function 26 cooperates with the media source 20 to have media content delivered toward the destination device 14, the media content may be encrypted based on the compliance encryption information by the compliant RM interface 22, wherein the encrypted media content is delivered by the compliant RM interface 22 to a source interface 36 of the interconnect device 16. Notably, the source interface 36 is preferably a compliant RM interface, which may cooperate with the compliant RM interface 22 of the source device 12 to ensure that media content having RM restrictions is delivered between these interfaces in an appropriate fashion. The encrypted media content is passed through a decryption function 38, which decrypts the encrypted media content to provide unencrypted media content, which is passed through a watermark detection function 40 to an encryption function 42. The watermark detection function 40 may process the unencrypted media content to detect watermarks that were applied to the media content and provide watermark information associated with any detected watermarks, and perhaps provide content information to the RM control function 34. The RM control function 34 may take action to determine whether the watermark recovered from the unencrypted media content is authentic.

Under control of the RM control function 34, the unencrypted media content is either re-encrypted by an encryption function 42 to provide encrypted media content and then passed to a destination interface 44, or passed to the destination interface 44 without re-encryption. Whether unencrypted or re-encrypted, the resulting media content is then delivered by the destination interface 44 to a non-compliant RM interface 46 of the destination device 14. If re-encrypted, the media content is preferably re-encrypted according to the appropriate RM requirements associated with the media content. As the unencrypted media content is delivered to the non-compliant RM interface 46, the unencrypted media content may be delivered to any number of sub-systems, such as an audio system 48, video system 50, processing system 52, or the like, depending on the type of media represented by the media content and the type of functionality provided by the destination device 14. Notably, all of the sub-systems as well as the non-compliant RM interface 44 may be under the control of a control system 54.

The destination device 14 may be the final destination of the media content before being presented to a user, or the destination device 14 may represent an intermediate node, which may act as a source device for delivering the media content to yet another destination device 14. As such, the destination device 14 may take various forms, such as a digital video recorder, set-top box, media server, television, display, or video monitor.

If the media content provided by the source device 12 is not subject to rights management restrictions, the media content may be delivered from the compliant RM interface 22 of the source device 12 to the source interface 36 of the interconnect device 16. At this point, the source interface 36 may deliver the media content to the destination interface 44, directly or through an intermediate processing function (not shown), and the destination interface 44 will deliver the media content to the non-compliant RM interface 46.

Turning now to FIGS. 2A-2F, a flow diagram is provided to illustrate operation of the source device 12, interconnect device 16, and destination device 14 according to one embodiment of the present invention. Initially, the media control function 26 will select or detect media content for delivery to the destination device 14 (step 100). The device driver 30 of the source device 12 will analyze the media content to identify any associated RM restrictions (step 102). If there are no RM restrictions associated with delivering the media content (step 104), the device driver 30 will cooperate with the media control function 26 to effect delivery of the media content via the source device's compliant RM interface 22 without restriction, and thus without encrypting the media content as would be required if there were RM restrictions (step 106).

The interconnect device 16 will then receive the media content via the source interface 36 (step 108), and deliver the media content to the destination device's non-compliant RM interface 46 via the destination interface 44 (step 110). The destination device 14 can then process the media content as desired. Notably, media content that is not associated with rights management restrictions may not be encrypted for transmission, and thus the non-compliant RM interface 46 or other function of the destination device 14 may not need to decrypt the media content prior to initiating any requisite processing of the media content.

If the device driver 30 analyzes the media content and determines that there are rights management restrictions associated with the media content (step 104), the source device 12 will query the interconnect device 16 to determine if the destination device 14 is compliant with the RM restrictions via the source device's compliant RM interface 22 (step 112). In response, the interconnect device 16 will determine the presence of a compliant RM interface at the destination device 14 via the destination interface 44 (step 114). In operation, the destination interface 44 may attempt to interrogate the non-compliant RM interface 46 to determine its compliance with the requisite rights management requirements, and then report back to the RM control function 34. Alternatively, the RM control function 34 may interact with the non-compliant RM interface 46 via the destination interface 44 to determine the compliance of the non-compliant RM interface 46 with the requisite rights management requirements. If there is no compliant rights management interface at the destination device 14 (step 116), as is the case in this example, the rights management control function 34 will notify the device driver 30 via the compliant RM interface 22 of the source device 12 or via the communication interfaces 24, 32 that there is no compliant RM interface available at the destination device 14 (step 118). The device driver 30 may notify the media control function 26 that no compliant RM interface is available at the destination device 14 (step 120) and cooperate with the media control function 26 to determine if the media content has a watermark (step 122).

If the media content has a watermark (step 124), the device driver 30 will determine whether the watermark can be authenticated (step 126). If the watermark cannot be authenticated (step 128), the device driver 30 will notify the RM control function 34 of the interconnect device 16 via the communication interfaces 24, 32 that the watermark cannot be authenticated (step 130). Accordingly, the RM control function 34 of the interconnect device 16 will prevent the media content from being delivered to the destination device 14 outside of the RM restrictions (step 132). In other words, the RM control function 34 will allow a reduced quality version of the media content to be passed to the destination device 14 via the destination device's non-compliant RM interface 46, if the RM restrictions allow the reduced quality version of the media content to be delivered to devices with non-compliant RM interfaces. Any version of the media content that is restricted according to the RM restrictions either will not be delivered to the destination device 14, or will be delivered to the destination device 14 without certain encryption required by the RM restrictions.

If the media content may be delivered to the destination device 14 at a restricted quality level, the media control function 26 may operate to downconvert the media content to a lower resolution, re-encode the media content at a higher compression rate, or the like, and then facilitate delivery of the media content to the interconnect device 16 via the compliant RM interface 22. The interconnect device 16 will treat the incoming media content as media content that is not associated with rights management restrictions, and effect delivery of the poorer quality media content to the non-compliant RM interface 46 of the destination device 14.

If the media content does not have a watermark (step 124), the device driver 30 of the source device 12 may employ the watermarking function 28 to apply a watermark to the media content, and provide authentication information for the watermark (step 134). The authentication information will be maintained at the source device 12, such that watermark information provided back to the source device 12 from the interconnect device 16 may be used to authenticate the watermark. After a watermark has been applied to media content (step 134), or after it has been determined that an existing watermark can be authenticated (step 128), the device driver 30 will notify the RM control function 34 of the interconnect device 16 via the communication interfaces 24, 32 that the watermark can be authenticated (step 136). The device driver 30 will then instruct the media control function 26 to initiate delivery of the watermarked media content to the interconnect device 16 (step 138). The media control function 26 will then initiate delivery of the watermarked media content via the source device's compliant RM interface 22 (step 140).

Next, the compliant RM interface 22 of the source device 12 will use compliance encryption information to encrypt the watermarked media content and deliver the watermarked media content to the source interface 36 of the interconnect device 16 (step 142). Although encryption is provided by the compliant RM interface 22 in this example, those skilled in the art will recognize that such encryption is essentially under the control of the control system 18, and may be provided by a separate encryption function (not shown). The decryption function 38 of the interconnect device 16 will decrypt the encrypted media content using appropriate compliance encryption information (step 144).

Notably, the watermark detection function 40 will process the decrypted media content in an effort to detect an embedded watermark, and if a watermark is detected, report its findings to the RM control function 34 (step 146). If a watermark was not detected (step 148), the RM control function 34 of the interconnect device 16 will take the necessary steps to prevent the media content from being delivered to the destination device 14 outside of the RM restrictions (step 150). Again, this may mean preventing any delivery of the media content to the destination device 14, or allowing a lower quality version of the media content to be delivered to the destination device 14 while preventing delivery of high quality media content to the destination device 14. If a high quality version of the media content is to be delivered to the destination device 14 under these conditions, the RM control function 44 may require the decrypted media content to be re-encrypted by the encryption function 42 according to certain RM restrictions.

If a watermark was detected in the unencrypted media content (step 148), the RM control function 34 of the interconnect device 16 will send corresponding watermark information, and optionally any necessary content information associated with the media content, to the device driver 30 of the source device 12 via the communication interfaces 24, 32 (step 152). Notably, the watermark information represents all or a portion of the information that is embedded in the media content to create the watermark. In response to receiving the watermark information, and perhaps the associated content information, the device driver 30 will attempt to authenticate the watermark in light of the watermark information and any associated content information (step 154). Notably, authentication of a watermark will not necessarily require associated content information. Those skilled in the art will recognize that different authentication schemes may or may not require additional information bearing on the media content itself in addition to the watermark information that was extracted from the media content to facilitate authentication. Further, authentication of the watermark will often involve comparing the watermark information, and perhaps the associated content information, with the authentication information that was created or otherwise stored in association with the watermark or media content in the source device 12.

If the watermark cannot be authenticated (step 156), the device driver 30 will notify the RM control function 34 of the interconnect device 16 via the communication interfaces 24, 32 that the watermark is not authentic (step 158), and the RM control function 34 of the interconnect device 16 will prevent the media content from being delivered to the destination device 14 outside of the RM restrictions, as described above (step 160).

If the device driver 30 determines that the watermark is authentic (step 156), the device driver 30 will notify the RM control function 34 of the interconnect device 16 via the communication interfaces 24, 32 that the watermark is authentic (step 162). The RM control function 34 of the interconnect device 16 will allow delivery of the media content to the non-compliant RM interface 46 of the destination device 14 outside of the normal RM restrictions (step 164). Accordingly, the decrypted media content is passed to the non-compliant RM interface 46 outside of the RM restrictions, and generally without being re-encrypted by the encryption function 42 (step 166). Thus, a high quality version of the media content may be passed to the destination device 14 in an unencrypted form.

If the media content is associated with rights management restrictions, and the destination device 14 has a compliant RM interface (not shown in FIG. 1) (step 116), the RM control function 34 will notify the device driver 30 via the compliant RM interface 22 of the source device 12 that a compliant RM interface is available at the destination device 14 (step 168). The device driver 30 will notify the media control function 26 that a compliant RM interface is available at the destination device 14 (step 170). The media control function 26 of the source device 12 may then initiate delivery of the media content (step 172), and as such, the media source 20 will begin delivery of the media content. The compliant RM interface 22 of the source device 12 will use compliance encryption information to encrypt the media content and deliver the encrypted media content to the source interface 36 of the interconnect device 16 (step 174). The encrypted media content received from the source device 12 is passed through the interconnect device 16 to the destination interface 44 of the interconnect device 16 and then on to the compliant RM interface (not shown) of the destination device 14 (step 176).

At this point, the compliant RM interface of the destination device 14 may decrypt the encrypted media content and deliver the unencrypted media content to the appropriate subsystem for further processing, presentation, or display (step not shown). The destination device 14 may be an intermediate device that acts as a destination device when receiving media content from a source device 12, and then acts as a source device for sending the media information to another destination device.

In one embodiment, the rights management mechanism is an HDCP, AACS, or like digital rights management system. Accordingly, the compliant RM interface 22 of the source device and the source interface 36, which is also a compliant RM interface, may be a DVI, HDMI, or like interface. Those skilled in the art will recognize other types of digital media interfaces that will benefit from the present invention. In a digital rights management embodiment, the compliant RM interface 22 may be an HDCP-compliant media interface, and the interconnect device 16 may cooperate with the source device 12 via the communication interface 24 and the compliant RM interface 22 to allow the media content that is associated with RM restrictions and properly watermarked to be delivered to the non-compliant RM interface 46 of the destination device 14 with little or no restrictions.

Figure 3:
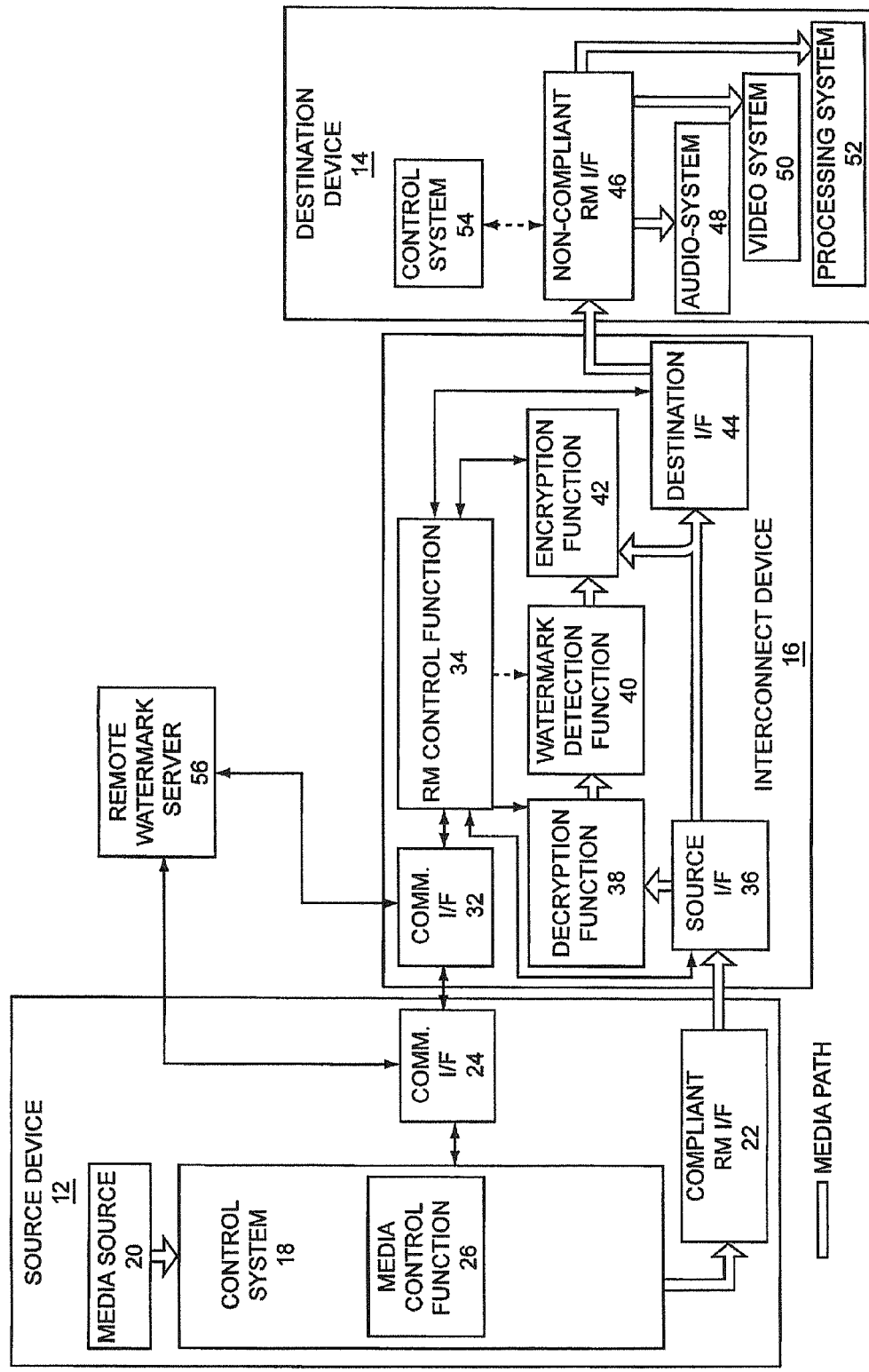
FIG. 3 is a block representation of a media environment according to a second embodiment of the present invention.
Figure 4A:
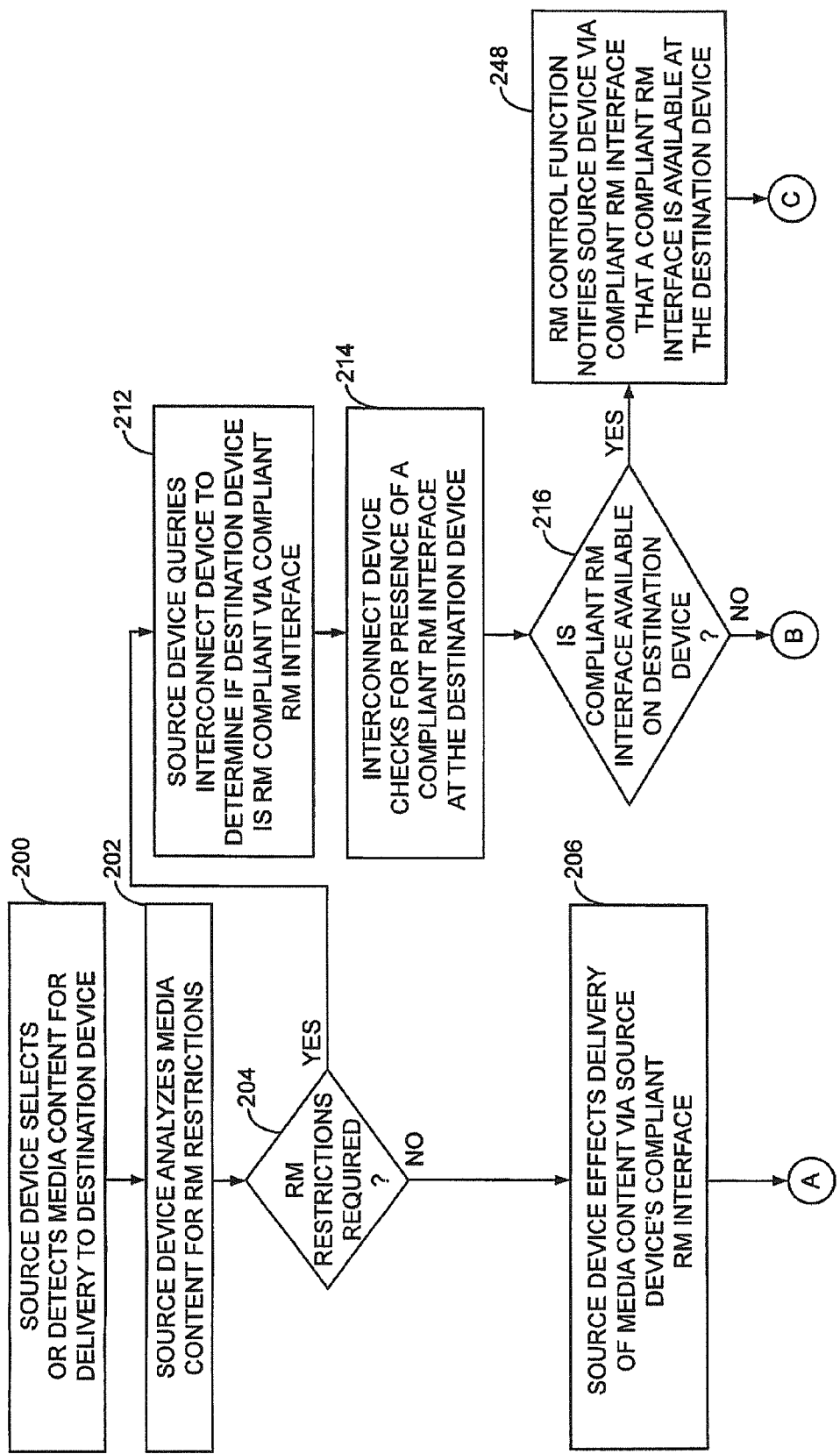
FIGS. 4A-4E are a flow diagram illustrating operation of one embodiment of the present invention.
Figure 4B:
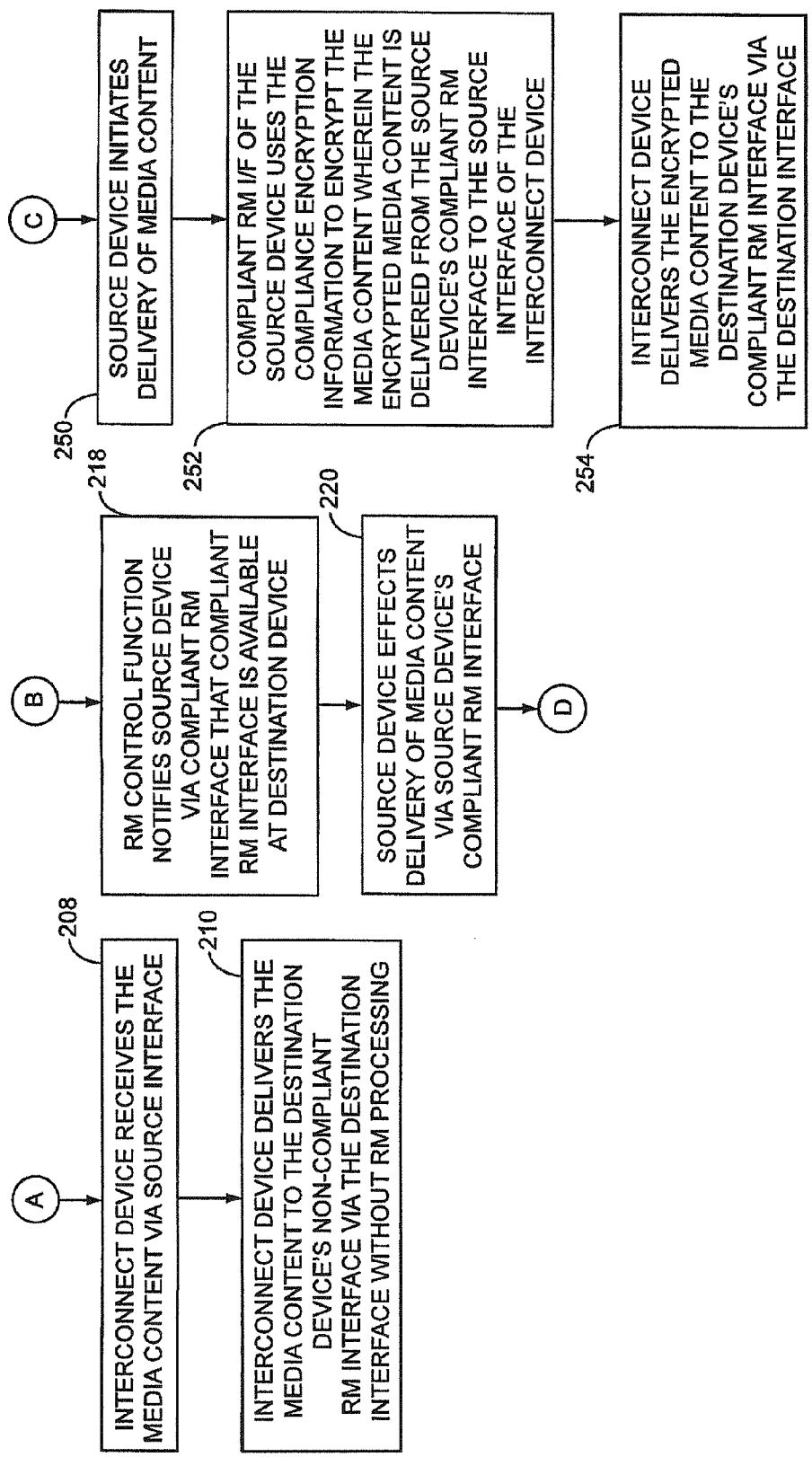
Figure 4C:
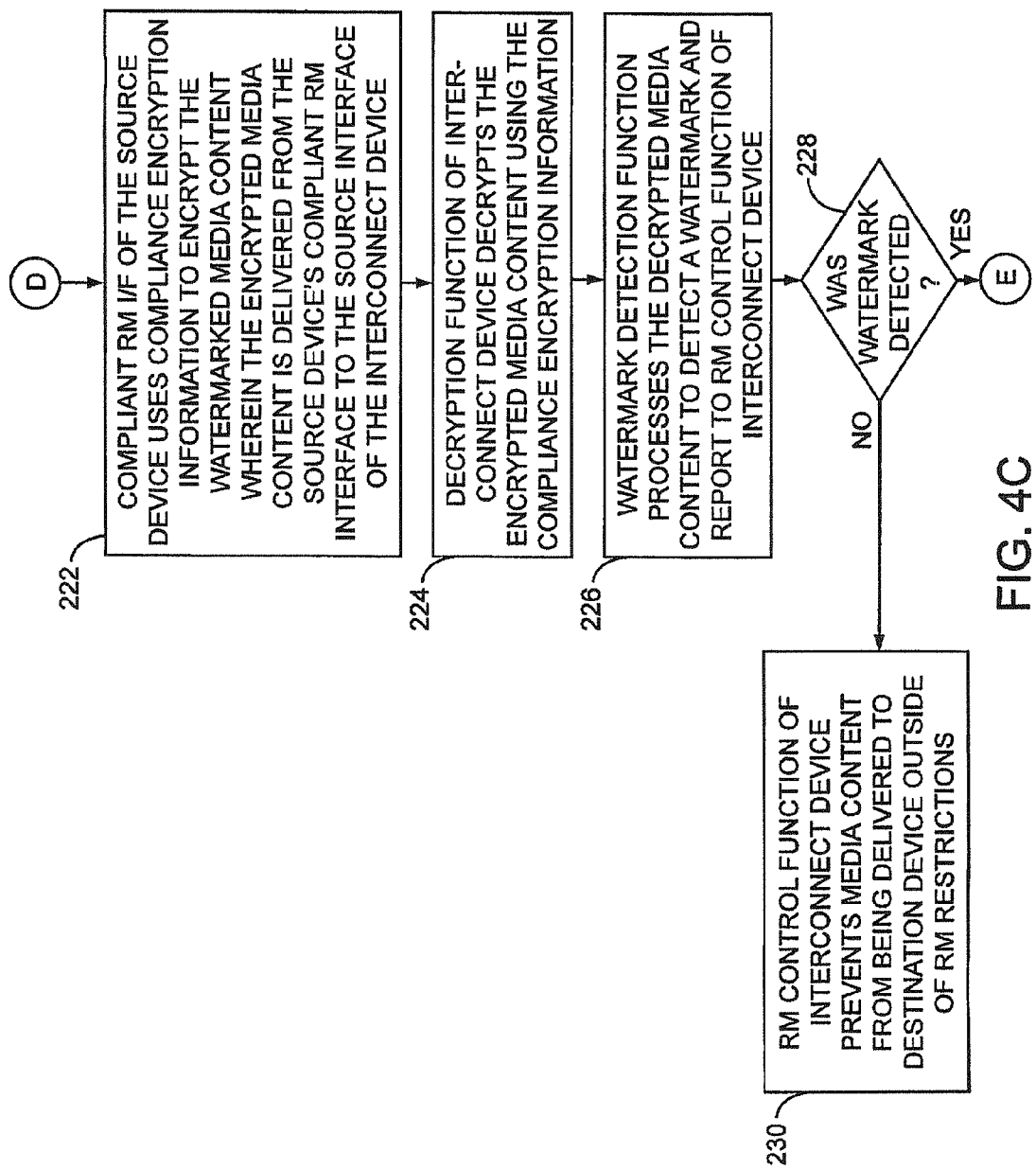
Figure 4D:
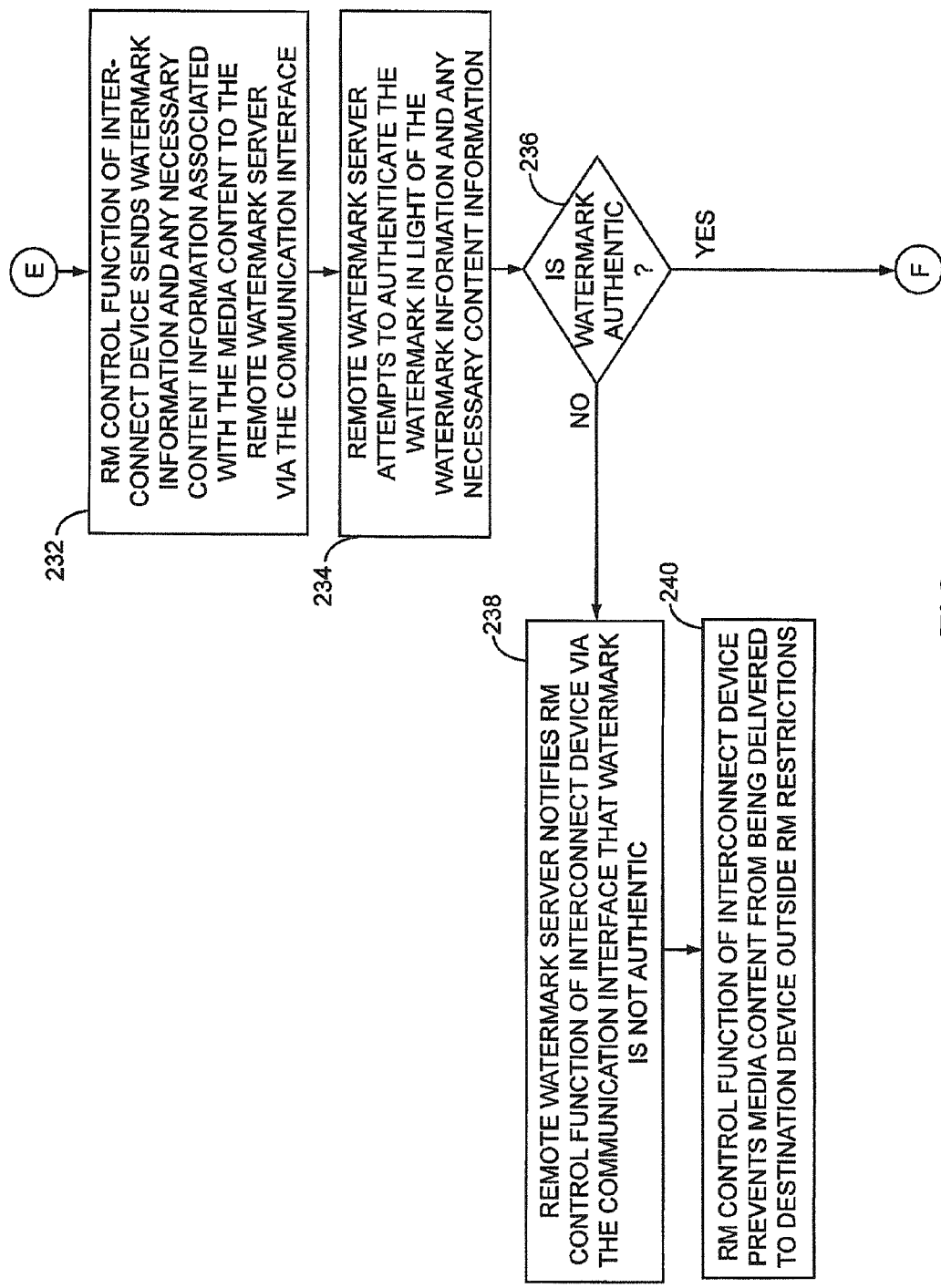
Figure 4E:
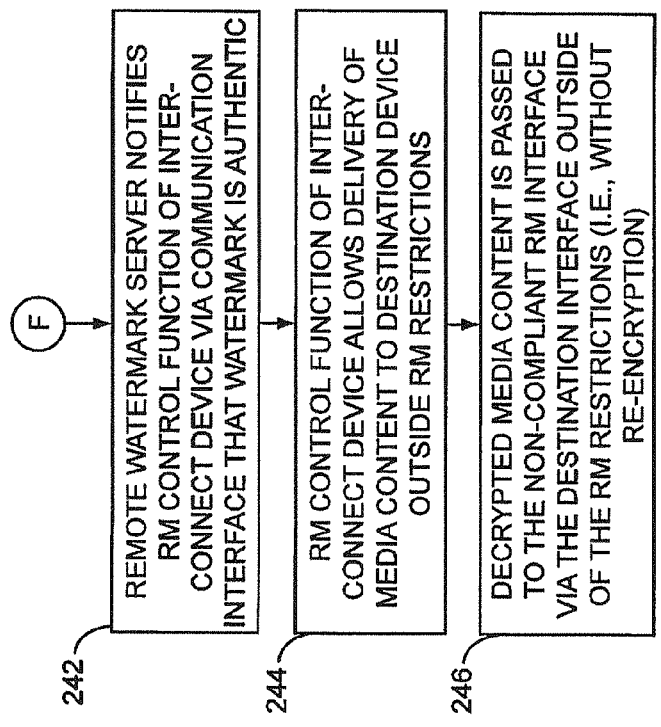

In FIG. 1 and the flow diagram of FIGS. 2A-2F, the source device 12 functions to authenticate watermarks detected by the interconnect device 16. Other entities may be used to authenticate the watermarks. For example, the interconnect device 16 may coordinate with an entity other than the source device 12, such as a remote watermark server 56 as illustrated in FIG. 3. For the embodiment shown in FIG. 3, the remote watermark server 56 may provide the authentication function and be able to communicate with the interconnect device 16 via the communication interface 32, and perhaps the source device 12 via the communication interface 24.

With reference to FIGS. 4A-4E, a flow diagram is provided to illustrate operation of the present invention when a remote watermark server 56 is used to authenticate watermark information provided by the interconnect device 16. Initially, the source device 12 will select or detect media content for delivery to the destination device 14 (step 200). The source device 12 will analyze the media content for RM restrictions (step 202), and if no RM restrictions are required (step 204), the source device 12 will effect delivery of the media content via the compliant RM interface 22 (step 206). The interconnect device 16 will receive the media content via the source interface 36 (step 208) and deliver the media content to the destination device's non-compliant RM interface 46 via the destination interface 44, without RM processing (step 210).

If RM restrictions are required for the media content (step 204), the source device 12 will query the interconnect device 16 to determine if the destination device 14 is RM compliant via the compliant RM interface 22 (step 212). The interconnect device 16 will check for the presence of a compliant RM interface at the destination device 14 (step 214), and if the destination device 14 does not have a compliant RM interface available (step 216), the RM control function 34 of the interconnect device 16 will notify the source device 12 via the compliant RM interface that a compliant RM interface is available at the destination device 14 (step 218). The reason that the RM control function 34 will tell the source device 12 that a compliant RM interface is available at the destination device 14 is to effectively trick the source device 12 into delivering the media content that is associated with RM restrictions to the interconnect device 16. As such, the interconnect device 16 can make the decision to deliver the media content on to the destination device 14 after analyzing any watermarks provided in the media content.

Accordingly, the source device 12 will effect delivery of the media content via the compliant RM interface 22 (step 220). The compliant RM interface 22 of the source device 12 will use compliance encryption information to encrypt the media content according to the RM restrictions, and then deliver the encrypted media content to the source interface 36 of the interconnect device 16 (step 222). The decryption function 38 of the interconnect device 16 will decrypt the encrypted media content using the compliance encryption information (step 224). Next, the watermark detection function 40 will process the decrypted media content to detect any watermarks embedded within the media content, and report any recovered watermark information to the RM control function 34 of the interconnect device 16 (step 226). Notably, content information may be provided along with the watermark information to the RM control function 34.

If a watermark was not detected (step 228), the RM control function 34 of the interconnect device 16 will prevent the media content from being delivered to the destination device 14 outside of the RM restrictions (step 230). If a watermark was detected (step 228), the RM control function 34 of the interconnect device 16 will send the watermark information and any necessary content information associated with the media content to the remote watermark server 56 via the communication interface 32 (step 232). The remote watermark server 56 will attempt to authenticate the watermark in light of the watermark information and any necessary content information (step 234).

If the watermark is not authentic (step 236), the remote watermark server 56 will notify the RM control function 34 of the interconnect device 16 via the communication interface 32 that the watermark is not authentic (step 238). The RM control function 34 of the interconnect device 16 will then prevent the media content from being delivered to the destination device 14 outside of the RM restrictions (step 240). If the watermark is authentic (step 236), the remote watermark server 56 will notify the RM control function 34 of the interconnect device 16 via the communication interface 32 that the watermark is authentic (step 242). As such, the RM control function 34 of the interconnect device 16 will allow delivery of the media content to the destination device 14 outside of the RM restrictions (step 244). Accordingly, the decrypted media content is passed to the non-compliant RM interface 46 of the destination device 14 via the destination interface 44 outside of the RM restrictions, and generally without being re-encrypted (step 246). Accordingly, high quality media content that is associated with RM restrictions, if watermarked, may be delivered to a destination device 14 without a compliant RM interface outside of the RM restrictions in a relatively secure fashion.

If the destination device 14 has a compliant RM interface (not shown in FIG. 3) (step 216), the RM control function 34 will notify the source device 12 via the compliant RM interface 22 that a compliant RM interface is available at the destination device 14 (step 248). The source device 12 will initiate delivery of the media content (step 250). The compliant RM interface 22 of the source device 12 will use the compliance encryption information to encrypt the media content, wherein the encrypted media content is delivered from the source device's compliant RM interface 22 to the source interface 36 of the interconnect device 16 (step 252). The interconnect device 16 will then deliver the encrypted media content to the destination device's compliant RM interface via the destination interface 44 (step 254).

In certain embodiments, the source device 12 and the remote watermark server 56 are available to authenticate watermarks in response to requests by the interconnect device 16. In other embodiments, one of the source device 12 or the remote watermark server 56 will not be available to authenticate watermarks. For instance, the source device 12 may not have such capabilities in certain embodiments. Regardless of the embodiment, an interconnect device 16 is able to coordinate with either a source device 12 that has a compliant RM interface 22 and perhaps an alternate communication interface 24 or a remote watermark server 56 to effectively and securely deliver watermarked media content that is associated with RM restrictions to a destination device 14 with a non-compliant interface 46. In one embodiment, an HDCP-compliant source device 12 may take advantage of the interconnect device 16 to be able to deliver authentic, full resolution media content at its highest quality to a non-HDCP-compliant destination device 14.

In one embodiment of the present invention, the interconnect device 16 is provided in the form of a cable that is used to connect a source device 12 to a destination device 14. The electronics necessary to provide the various interfaces and functions may have a separate power supply, or power may be derived from the compliant RM interface 22 of the source device 12 or from the non-compliant RM interface 46 of the destination device 14.

Figure 5:
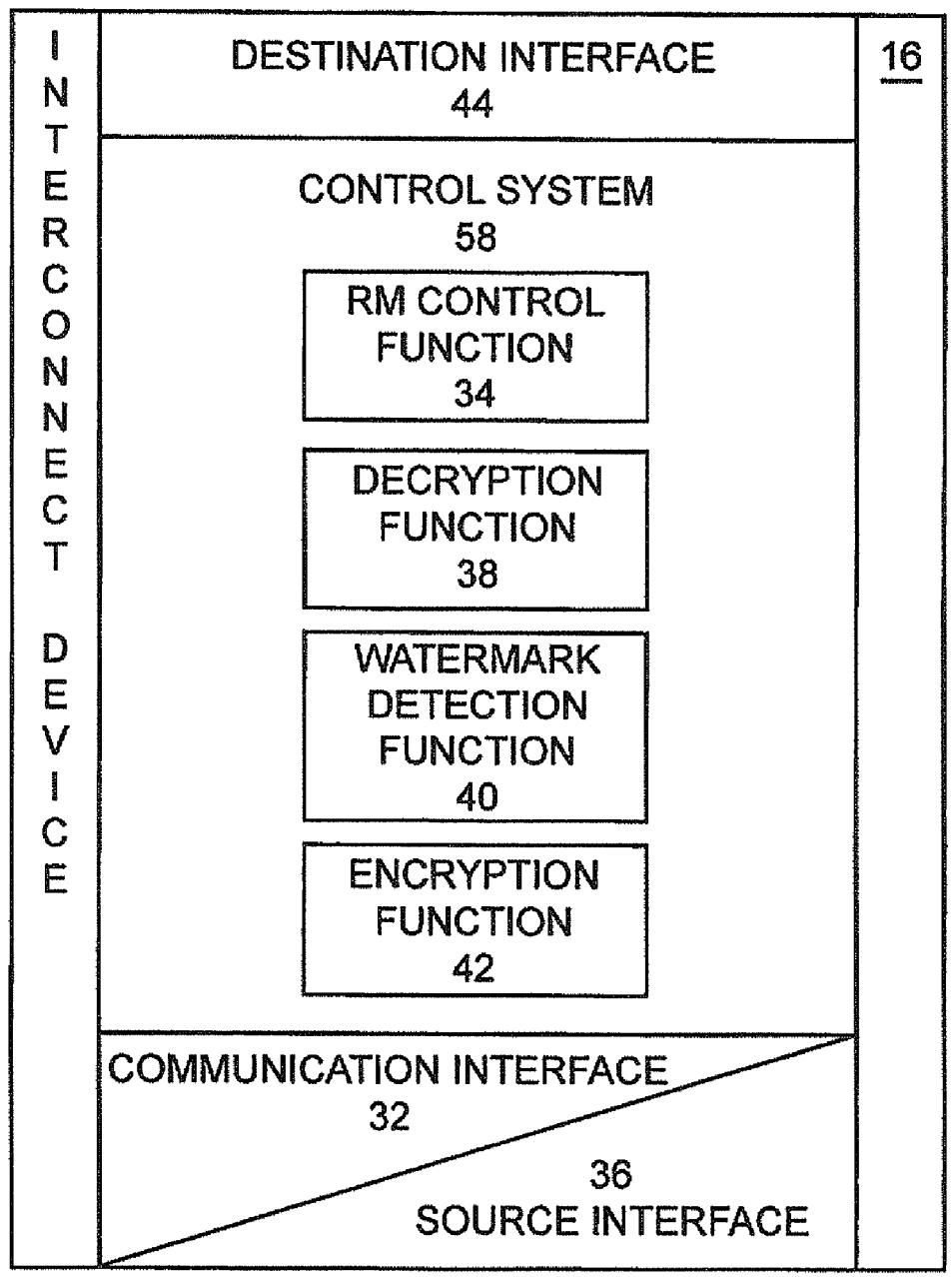
FIG. 5 is a block representation of an interconnect device according to one embodiment of the present invention.

With reference to FIG. 5, a block representation of an interconnect device 16 according to one embodiment of the present invention is illustrated. The interconnect device 16 will include a control system 58, which supports the RM control function 34, the decryption function 38, the watermark detection function 40, and the encryption function 42, as described above. Further, the control system 58 is associated with the destination interface 44, which may be configured to connect to a compliant or non-compliant RM interface of the destination device 14 through an appropriate cable. Similarly, the control system 58 is associated with the source interface 36, which is configured to connect to a compliant RM interface 22 of a source device 12 through an appropriate cable. Notably, the destination interface 44 and the source interface 36 may provide a wireless interface to the respective destination and source devices 14, 12. The communication interface 32 is also associated with the control system 58, and may provide a basic communication interface using wired or wireless mechanisms to communicate directly or indirectly with the communication interface 24 of the source device 12, the remote RM server 56, or both.

Those skilled in the art will recognize improvements and modifications to the preferred embodiments of the present invention. All such improvements and modifications are considered within the scope of the concepts disclosed herein and the claims that follow.

What is claimed is:

1. A method for authenticating a watermark comprising:
receiving, at a source device, a watermark authentication request comprising watermark information corresponding to a digital watermark detected in media content by an interconnect device, wherein the interconnect device sends the watermark authentication request;
determining, at the source device, whether the digital watermark is authentic based on the watermark information; and
sending, from the source device, an authentication response indicative of whether the digital watermark is authentic.

2. The method as recited in claim 1, wherein the watermark authentication request is directly received from the interconnect device.

3. The method as recited in claim 2, wherein the authentication occurs remotely from the interconnect device.

4. A source device comprising:
a communication interface; and
a processor associated with the communication interface and configured to:
receive a watermark authentication request comprising watermark information corresponding to a digital watermark detected in media content by an interconnect device, wherein the interconnect device sends the watermark authentication request;
determine whether the digital watermark is authentic based on the watermark information; and
send an authentication response indicative of whether the digital watermark is authentic.

5. A non-transitory computer readable medium having software comprising instructions for a processor of a source device to:
receive a watermark authentication request comprising watermark information corresponding to a digital watermark detected in media content by an interconnect device, wherein the interconnect device sends the watermark authentication request;
determine whether the digital watermark is authentic based on the watermark information; and
send an authentication response indicative of whether the digital watermark is authentic.

* * * * *